Dec. 6, 1932.   R. E. FRICKEY   1,889,780

WELDING PROCESS

Filed June 2, 1930

INVENTOR.
ROYAL E. FRICKEY
BY
ATTORNEYS.

Patented Dec. 6, 1932

1,889,780

UNITED STATES PATENT OFFICE

ROYAL E. FRICKEY, OF SAN FRANCISCO, CALIFORNIA, ASSIGNOR TO WELDING SERVICE, INC., OF SAN FRANCISCO, CALIFORNIA, A CORPORATION OF CALIFORNIA

WELDING PROCESS

Application filed June 2, 1930. Serial No. 459,005. REISSUED

This invention relates generally to processes or methods for welding upon the rails of railroad tracks, and to apparatus which can be utilized to advantage in such processes. The process has particular application for applying weld metal to the surfaces of rails, as for example for building up the worn ends of rail ends adjacent a rail joint.

It is a general object of the present invention to devise a process of the above character which would tend to increase the quality of welds made on railroad rails, and which will facilitate such welding operations.

It is a further object of the present invention to devise novel apparatus which can be utilized for heat treating portions of rails preparatory to welding operations.

Further objects of the invention will appear from the following description in which the preferred embodiment of the invention has been set forth in detail. It is to be understood that the appended claims are to be accorded a range of equivalents consistent with the state of the prior art.

Referring to the drawing.

In the past it has been common to perform welding operations upon rails, while the rails are at substantially normal or atmospheric temperature. As the result of observations over a long period of time, I have discovered that welds made upon rails in this manner, without preheating of the rail, frequently result in a weld which is defective. I attribute this in part to the fact that shock stresses are set up in the portion of the rail being welded, due to the application of a relatively high temperature arc or flame and hot fused metal to the cold body of the rail. Furthermore the penetration of the weld metal into the base metal of the rail is not always as great as is desired in order to secure an adequate bond, and it frequently happens that the weld metal does not properly penetrate and unite a compression fracture occurring at the point of weld. I have discovered that if the rail is properly heated prior to a welding operation, a superior quality of weld results. Shock stresses resulting from the application of a high temperature arc or flame and the hot fused weld metal are materially reduced, and the weld metal being deposited flows on more readily and smoothly. Furthermore a better penetration is effected between the weld metal and the base metal of the rail, thus securing a more effective bond. If the weld is being made over a compression fracture in the end of the rail, the operator can more readily melt the portions of the rail above the fracture, thus securely bonding the fracture portions together. It has also been found that in applying weld metal materially harder than the metal of the rail, proper preheating of the rail as will be presently described, prevents overhardening of the deposited metal which might happen if the metal were applied to a cold rail. Just below the added weld metal there always occurs a horizontal layer in the base metal of the rail which has been heated above the critical temperature by the addition of the weld metal and which later is cooled rapidly enough to result in hardness exceeding the remainder of the rail. It is desirable that this hardened zone be as deep as possible and that result is attained by the described heat-treating process.

Figure 1:
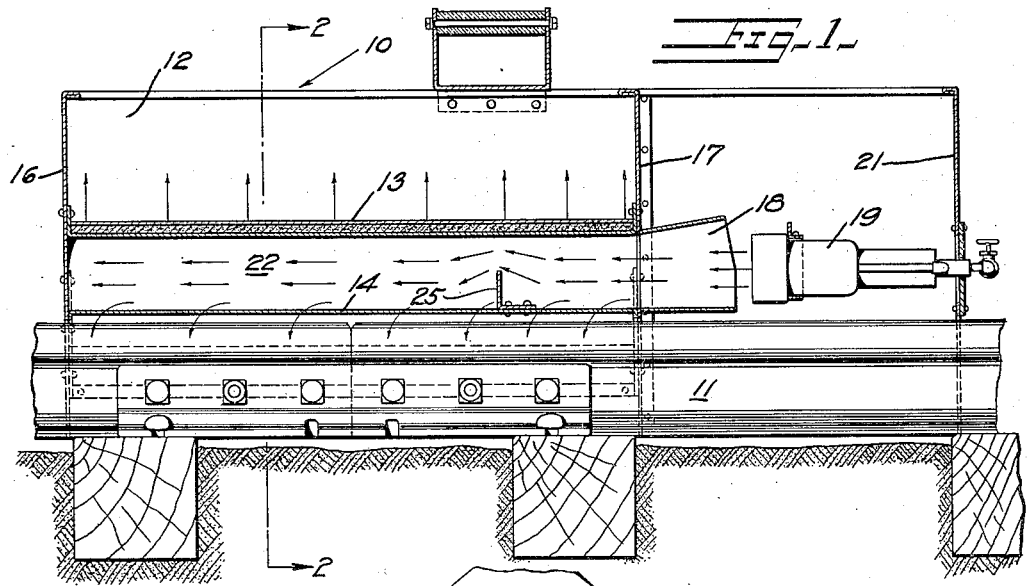
Figure 1 is a side elevational view, partly in cross section, illustrating novel apparatus which can be utilized in my process.
Figure 2:
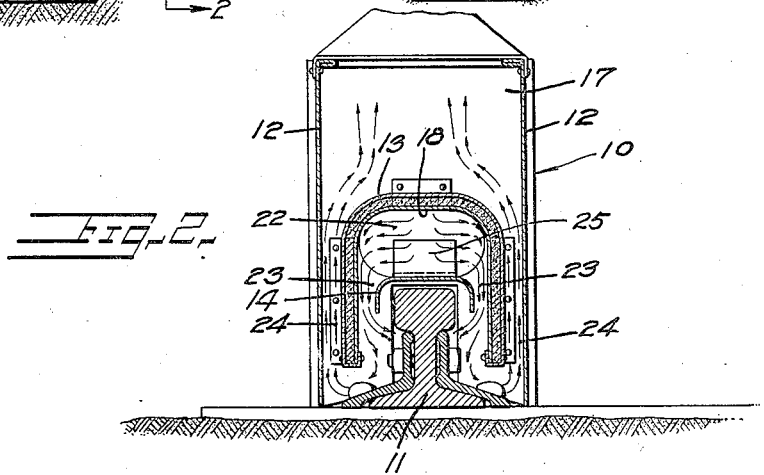
Fig. 2 is a cross sectional view taken along the line 2—2 of Fig. 1.

The preferred manner in which I preheat the rail prior to a welding operation, can best be described by first explaining the novel apparatus which I utilize, and which is illustrated in the accompanying drawing. Thus referring to Figs. 1 and 2, there is shown a structure 10 adapted to be positioned over a portion of a rail 11, to be preheated prior to a welding operation. This structure includes a pair of upright side walls 12, which are secured in spaced relationship to the sides of an inverted hood 12. Positioned within the hood 13, there is a longitudinal baffle member 14, which is normally adapted to overlie and extend across the upper surface of the rail 11. The ends of structure 10 are enclosed by end walls 16 and 17, and an entrance portion 18 is provided for introduction of hot gas. This entrance portion 18 communicates thru end wall 17, with the space between hood 13 and baffle 14.

In conjunction with the structure described above, I employ means for generating relatively hot gas, such as an oil burner 19, which is adapted to be carried by a suitable support 21. Burner 19 is preferably of the blow torch type, and its flame is directed to the entrance portion 18. It will be noted that the space between baffle 14 and the upper portion of hood 13 forms a longitudinal passageway 22 for passage of hot gas, while the spaces on opposite sides of the rail, and between the rail and sides of hood 13 form passages 23. The lower portions of passages 23 communicate with passages 24 formed between the sides of hood 13 and side walls 12. As hot gases from burner 19 are introduced into structure 10, they are distributed along longitudinal passages 22, are caused to flow downwardly thru passages 23 in contact with opposite sides of rail joint and are then caused to flow upwardly thru passages 24 to be discharged to the atmosphere. A transverse baffle 25 mounted upon baffle 14 secures better distribution of hot gas downwardly from the forward part of baffle 14. Baffle 14 prevents the hot gases and the flame from burner 19 from coming directly into contact with the upper surface of the rail, thus protecting this surface from overheating. Since this baffle 14 becomes heated, it also imparts considerable heat to the top of the rail by radiation. That portion of the rail over which structure 10 is disposed is therefore heated by bringing hot gases directly into contact with the sides of the ball portion and the sides of the rail joint, and by radiation from baffle 14.

Figures 3, 4:
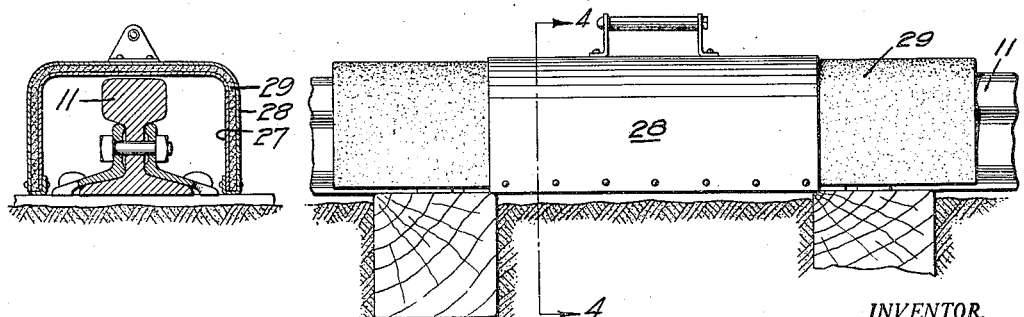
Fig. 3 is a side elevational view of a blanket shield which I prefer to utilize in my process.
Fig. 4 is a cross sectional view taken along the line 4—4 of Fig. 3.

After a heating period with the apparatus described above, it will be found that the portion of the rail being treated will not be heated to a uniform degree. That is, all portions of the rail will not be heated to a uniform temperature. Therefore following the heating period, I prefer to subject that portion of the rail being treated to a soaking operation. During this soaking operation I preferably prevent loss of heat by suitably insulating the rail. Heat insulating the rail can be accomplished by the use of a suitable covering of heat insulating material, as for example the blanket shield as shown in Figs. 3 and 4. This blanket shield consists of inner and outer sheet metal hoods 27 and 28, separated by a layer 29 of heat insulating material such as asbestos or woolen cloth. Insulating material 29 can extend beyond the ends of hoods 27 and 28 so that it can closely envelop the rail. After concluding a heat operation, the apparatus 10 is removed from the rail, and the blanket shield is placed over the heated rail portion as shown in Fig. 3. While the heated rail portion is being enclosed by the blanket shield, the heat becomes uniformly distributed thru the rail, so that different portions of the rail tend to attain substantially the same temperature. After this soaking operation, the blanket shield is removed, and the welding operation is then made in any well known manner, as by the oxy-acetylene torch, or by electrical welding. The process gives particularly good results when the welding operation is for the purpose of applying a hard weld metal to the upper surfaces of the rail, as for example in building up worn ends of rails at rail joints.

As a specific example of my process, and not by way of limitation, I have found that in welding operations requiring building up of worn rail ends at rail joints with hard weld metal, good results can be obtained by continuing the heating period for about five minutes for electrical welding, and about fifteen minutes or more for oxy-acetylene welding. A burner consuming about one gallon of kerosene per hour can be employed for supplying the heat. The heat is applied to the rail for a substantial distance beyond the portion to which the weld metal is to be applied. After the heating period, good results can be secured by extending the soaking period for about five minutes, or if convenient this period can be extended for twenty minutes or more. In most instances after the soaking period the heated portion is at a temperature of somewhat more than 150 degrees F. The rail does not tend to cool during the welding operation, but actually increases its temperature due to the heat of the weld.

I claim:

1. In a method of welding rails, to form a welded portion having an upper layer of weld metal and a zone of hardened metal of substantial extended depth below the weld metal, the steps of preheating a localized rail portion to be welded, applying a layer of fused weld metal to the upper surface of the same, and then permitting the rail portion to cool, whereby there is formed a zone of hardened metal of substantial extended depth below the weld metal.

2. In a method of welding rails, to form a welded end portion having an upper layer of weld metal and a zone of hardened metal of substantial extended depth below the weld metal, the steps of preheating the end portion of the rail to be welded, applying a layer of fused metal to the upper surface of the same, and then permitting the rail end portion to cool, whereby there is formed a zone of hardened metal of substantial extended depth below the weld metal.

In testimony whereof, I have hereunto set my hand.

ROYAL E. FRICKEY.